(No Model.)
L. E. WOODARD.
HORSE COLLAR.
No. 272,824. Patented Feb. 20, 1883.
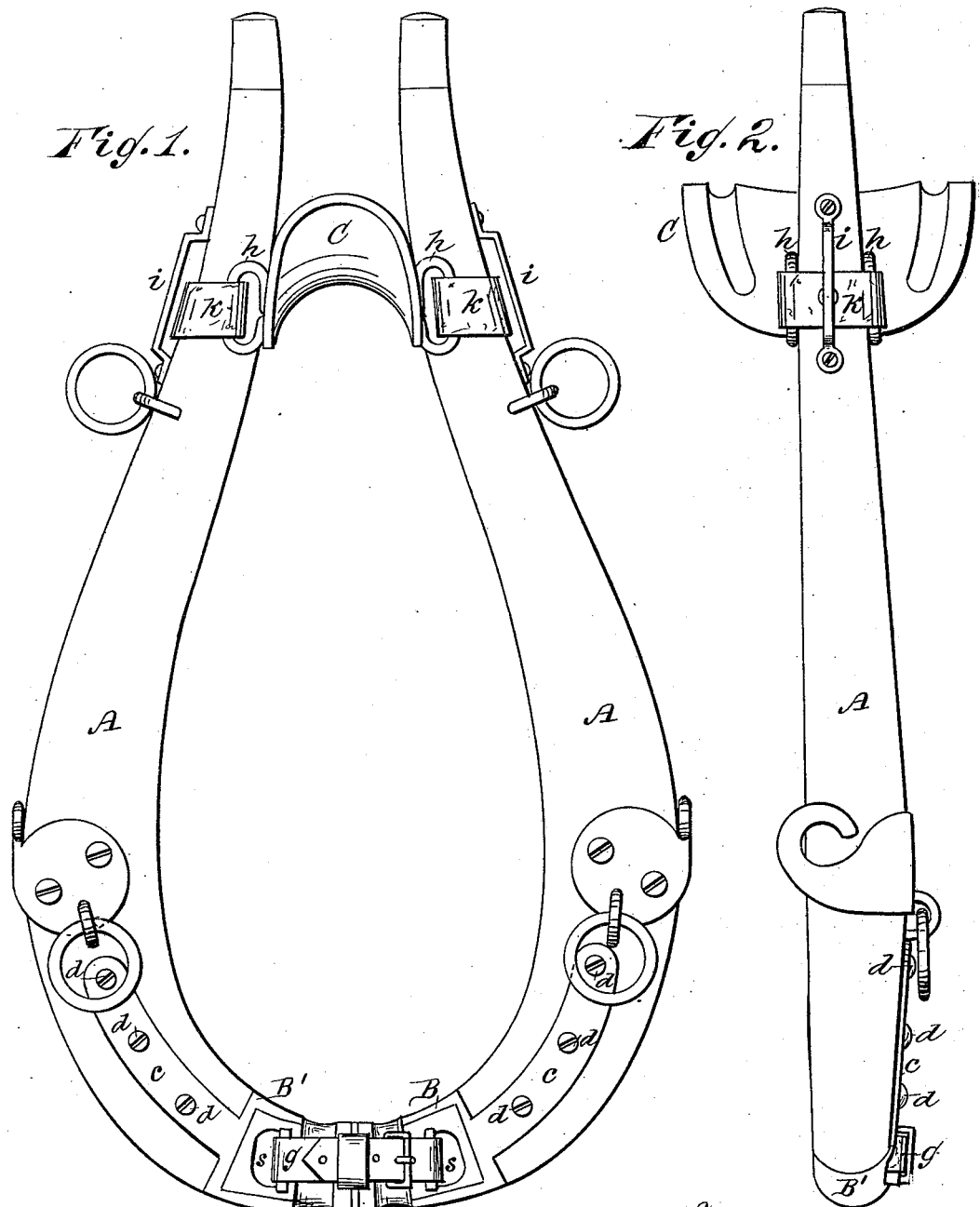
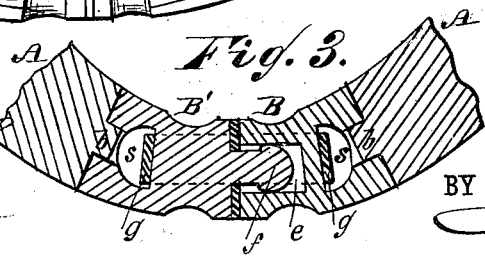
WITNESSES:
INVENTOR:
L. E. Woodard
BY Munn & Co.
ATTORNEYS.

UNITED STATES PATENT OFFICE.

LYMAN E. WOODARD, OF OWOSSO, MICHIGAN.

HORSE-COLLAR.

SPECIFICATION forming part of Letters Patent No. 272,824, dated February 20, 1883.

Application filed November 9, 1882. (No model.)

*To all whom it may concern:*

Be it known that I, LYMAN E. WOODARD, of Owosso, in the county of Shiawassee and State of Michigan, have invented a new and useful Improvement in Horse-Collars, of which the following is a full, clear, and exact description.

This invention consists in certain combinations, with a sectionally-constructed wooden horse-collar, of special devices for uniting the ends of the collar-sections, and whereby provision is made for interchanging said coupling devices, substantially as hereinafter described.

Reference is to be had to the accompanying drawings, forming a part of this specification, in which similar letters of reference indicate corresponding parts in all the figures.

Figure 1 represents a front view of a horse-collar embodying my invention; Fig. 2, a side or edge view of the same; and Fig. 3, a sectional view, upon a larger scale, of certain metallic uniting devices at the bottom of the collar.

The body of the collar is formed of two sections or halves, A A, made of wood, united by suitable couplings above and below, substantially as hereinafter described. The bottom of this wooden collar or lower ends of the wooden sections A A are provided with metallic couplings or attachments B B', which are constructed with sockets in the inner ends of their bodies to receive within them shouldered portions or tenons $b$ on said ends of the sections A A. Said couplings are further secured, each to its respective collar-section A, by metallic straps $c$, extending backward or upward from the shouldered support of the couplings on the lower ends of the collar-sections, and united to the face or back of the collar by screws or bolts $d\ d$. The outer or meeting-end portions of the couplings B B' are constructed, the one, B, with a mortise or socket, $e$, and the other, B', with a stud or tenon, $f$, which, when the bottom of the collar is closed, enters within the socket $e$ of the adjacent coupling-piece B. When thus united the parts may be held together by a leather strap, $g$, fitted with buckling devices and arranged to pass through slots $s\ s$ in the coupling-pieces B B'. A leather or other washer may be interposed between the meeting ends of said coupling-pieces. In manufacturing these coupling pieces or irons B B' in quantities to suit either the same or different sized collars, or collars which require to be more or less spread to adapt them to horses of different sizes or proportions, said coupling-irons are all made of the same dimensions from and including their socketed portions, which fit on the tenons or shouldered lower ends, $b$, of the wooden sections A A, likewise including their securing metallic strap extensions $c$, and with the apertures for the screws or bolts $d$, arranged alike in all of said irons. By this construction the coupling-irons are interchangeable, so that any one pair of any number of them may be screwed to the same wooden collar-sections. The holes for the screws $d$ in the straps $c$ correspond in every case with screw or bolt holes in different wood sections A A; but such irons B B' are made of different lengths in their bodies from where they form their shouldered connection with the collar-sections A A to their meeting ends, including their socketed and tenoned portions $e\ f$ or socket-joints. This provides, by changing the irons B B', for adjusting the same collar to fit different-sized horses, the neck-piece C also being changed to correspond. The neck irons or pieces C are also made interchangeable, and constructed with loops $h\ h$, arranged to embrace the sides of the collar-sections between them, and through which and through guards $i\ i$ on said sections leather straps $k\ k$, which may be secured by pinning or otherwise, pass to hold the neck-piece in place and keep the collar from rolling. These collar neck-pieces C may be made of malleable cast-iron or other suitable material.

Having thus described my invention, I claim as new and desire to secure by Letters Patent—

The combination of the wooden sections A A of a horse-collar with the metallic couplings B B', having the extensions $c\ c$, slots $s\ s$, socket $e$, and tenon $f$, as described, and the strap $g$, substantially as and for the purpose specified.

LYMAN E. WOODARD.

Witnesses:
B. F. TAYLER,
B. H. STRAHLE.